United States Patent [11] 3,578,348

| [72] | Inventor | Richard F. Reinke<br>P.O. Box 272, Deshler, Nebr. 68340 |
|---|---|---|
| [21] | Appl. No. | 782,624 |
| [22] | Filed | Dec. 10, 1968 |
| [45] | Patented | May 11, 1971 |

[54] FERTILIZER TRAILER
8 Claims, 8 Drawing Figs.

[52] U.S. Cl. .................................................. 280/5,
111/7
[51] Int. Cl. ..................................................... B60p 3/22
[50] Field of Search........................................ 280/5;
239/172, 175, 159; 111/5—7

[56] References Cited
UNITED STATES PATENTS

| 2,125,252 | 7/1958 | Balaam.......................... | 280/5(E) |
| 2,199,421 | 5/1940 | Stevens ......................... | 111/6X |
| 2,275,302 | 3/1942 | Magnuson..................... | 280/5(E) |
| 2,563,372 | 8/1951 | Risse .............................. | 280/43 |
| 3,295,482 | 1/1967 | Dountas et al................. | 111/7 |
| FOREIGN PATENTS | | | |
| 666,421 | 5/1929 | France .......................... | 239/159 |
| 816,706 | 8/1951 | Germany....................... | 239/175 |
| 948,293 | 8/1956 | Germany....................... | 239/172 |
| 827,275 | 2/1960 | Great Britain................ | 280/5(E) |
| 102,149 | 7/1941 | Sweden ........................ | 280/5(E) |

*Primary Examiner*—Leo Friaglia
*Attorneys*—Clarence A. O'Brien and Harvey B. Jacobson

ABSTRACT: A wheeled fertilizer trailer wherein the tank is mounted within a wheeled frame to present a low profile and lower the center of gravity of the trailer. The frame having a relatively high location relative to growing crops and having very small projections on the bottom thereof, the clearance for crops is higher than conventional fertilizer trailers wherein the tank is mounted on top of the wheeled trailer.

Patented May 11, 1971
3,578,348
3 Sheets-Sheet 1
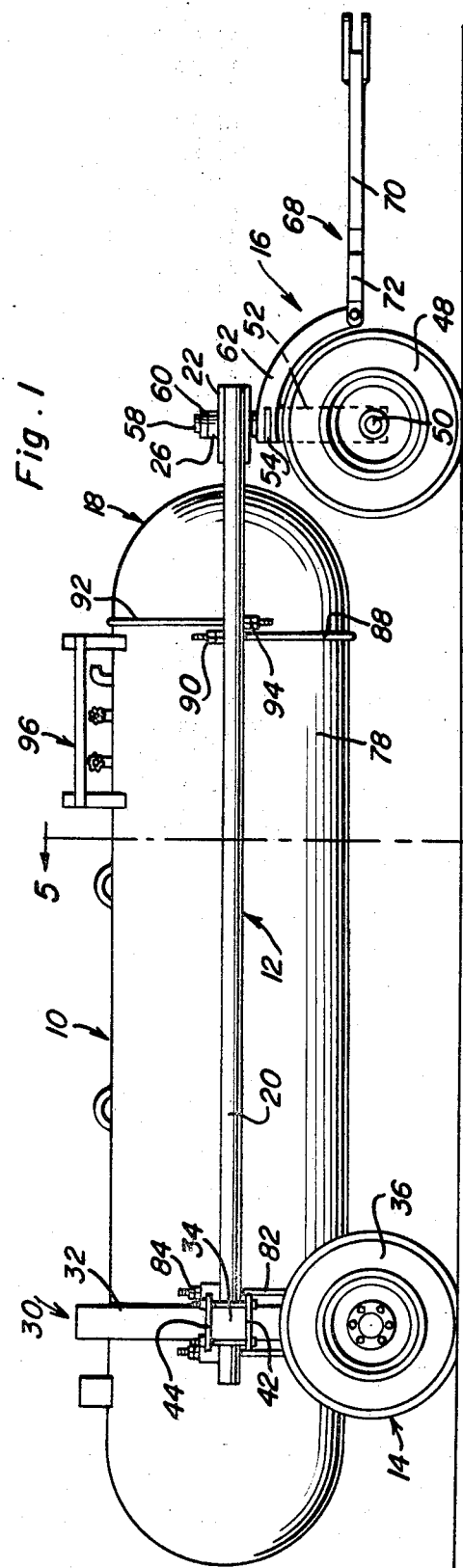
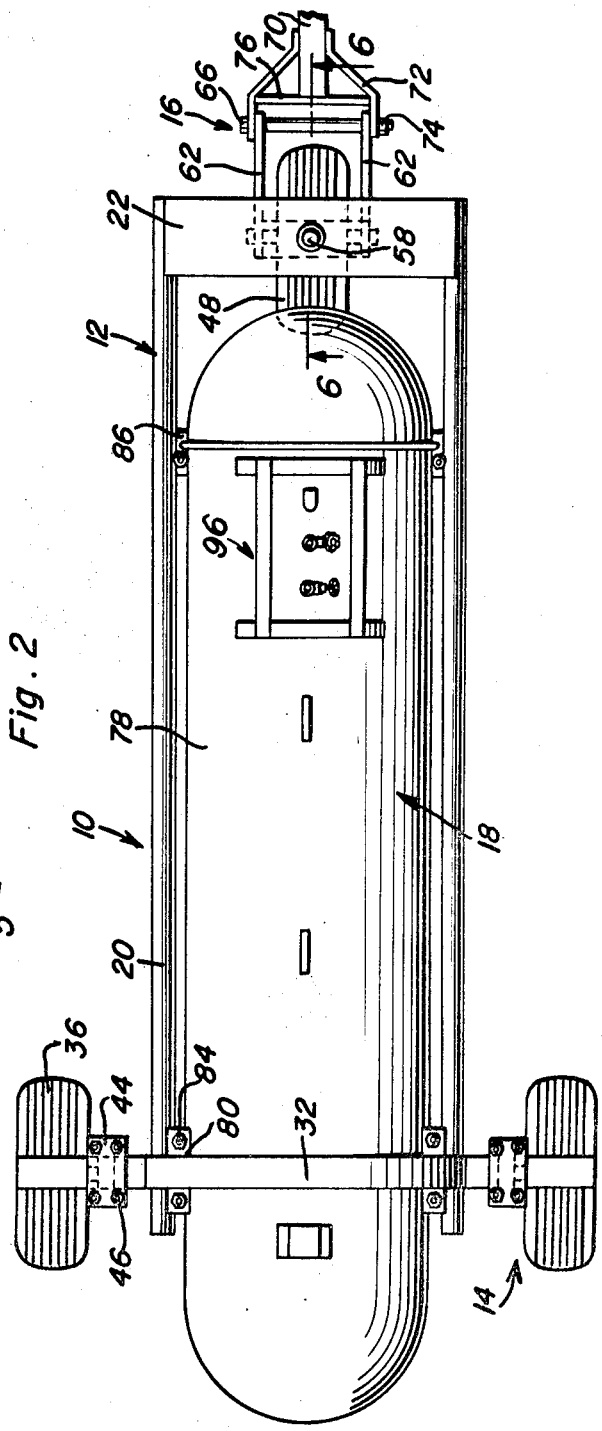
Richard F. Reinke
INVENTOR.
BY *Clarence A. O'Brien*
*and Harvey B. Jacobson*
Attorneys Patented May 11, 1971

Richard F. Reinke
INVENTOR.

BY *Clarence A. O'Brien*
*and Harvey B. Jacobson*
Attorneys

Patented May 11, 1971
3,578,348
3 Sheets-Sheet 3
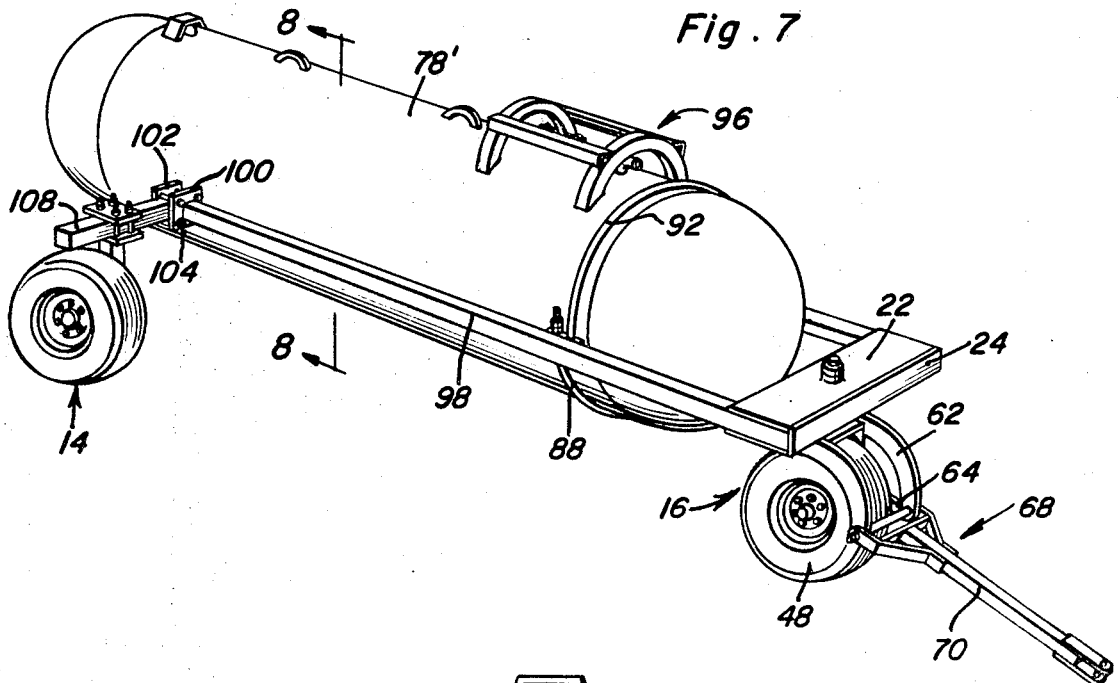
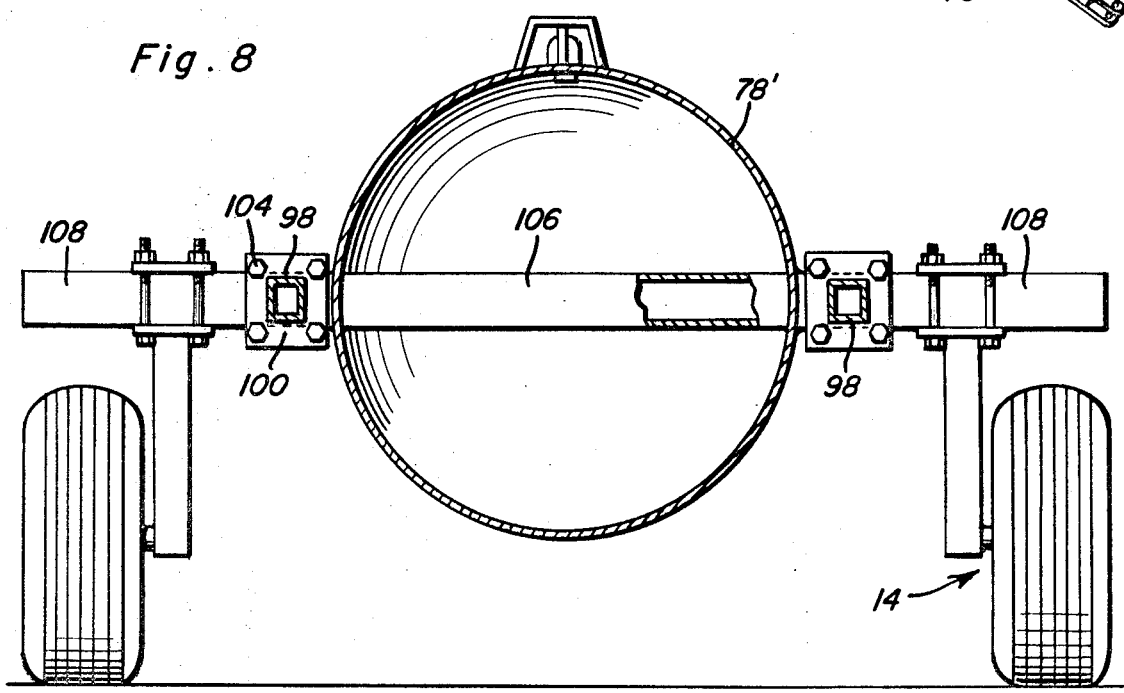
Richard F. Reinke
INVENTOR.
BY *Clarence A. O'Brien*
*and Harvey B. Jacobson*
Attorneys

FERTILIZER TRAILER Heretofore, wheeled fertilizer tanks of the type for anhydrous ammonia, have consisted of nothing more than a large tank mounted on top of a rigid wheeled frame. This basic structure will accomplish the fertilizing but poses certain problems, such as: the rigid frame being the lowest point on the fertilizer trailer extremely low crop clearance is provided and the frame will damage many crops engaged thereby, when fertilizing on slopes, if the slope is more than a gentle rise the center of gravity of the tank occurs outside of the downhill wheel thus permitting the tank to tip over or the trailer itself to side slip down the hill, and the high mounting of the tank on such a frame requires a climbing of a ladderlike appliance to get to the controls and feed line on top of the tank trailer.

The present invention relates to a fertilizer trailer wherein the tank for holding the reservoir of fertilizer is mounted within a rigid wheeled frame. The rigid wheeled frame is generally U-shaped with the rear wheels positioned at the mouth of the U and a single steerable wheel at the base of the U with the tank mounted in the open part of the U-shaped frame. By mounting the tank within the rigid framework the tank can be mounted extremely low to the ground thereby drastically lowering the center of gravity of the trailer. Further, with the smooth underbody of the tank being the lowest part of the trailer and that which contacts any crops passed over, there is less chance of the crops snagging on the structure of the trailer vehicle. The extreme low center of gravity of the trailer permits fertilizing on sides of hills and slopes without the trailer side slipping down the hill or a danger of complete turning over of the trailer due to the center of gravity occuring outside of the downhill wheel. The single dirigible wheel and the leading end of the trailer permits a turning radius only slightly larger than the length of the vehicle itself. The rear wheels of the trailer are also adjustable so that the trailer wheel tread may be adjusted to accommodate any width of rows of crops.

It is therefore an object of this invention to provide a simple but unique fertilizer trailer for use with anhydrous ammonia.

It is a further object of this invention to provide a fertilizer trailer with the fertilizer tank being mounted within the wheeled frame.

It is a further object of this invention to provide a fertilizer trailer wherein the center of gravity of the tank of fertilizer occurs at or below the wheeled frame.

It is a further object of this invention to provide a fertilizer trailer with a high clearance for crops passing beneath the trailer.

It is a still further object of this invention to provide a fertilizer trailer that has no undercarriage or frame to snag the crops that are passed over.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the fertilizer trailer of the present invention.

FIG. 2 is a top plan view of the fertilizer trailer.

FIG. 7 is a perspective view of another embodiment of fertilizer trailer.

FIG. 8 is a sectional view taken substantially along the line 8–8 of FIG. 7.

Figure 3:
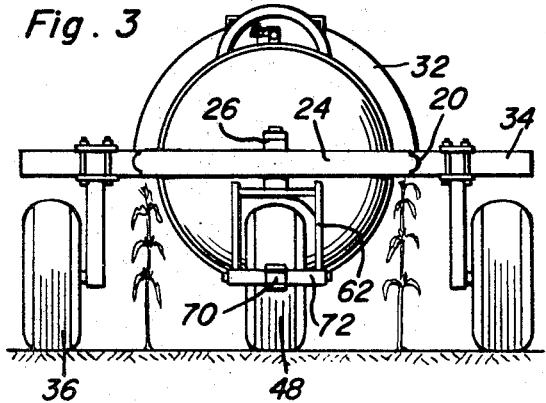
FIG. 3 is a front end elevational view of the fertilizer trailer when on level ground.

Referring now to the drawings numeral 10 generally indicates the subject fertilizer trailer, with the frame thereof designated by numeral 12, the rear wheel assembly by numeral 14, the front wheel assembly by numeral 16, and the reservoir tank assembly by the numeral 18.

The frame 12 of the fertilizer trailer comprises two main longitudinal beams 20 which are held in parallel spaced relation at the front thereof by transversely extending brace plates 22 which are attached to the circumference of the beams 20 at a point tangential to the top and bottom. A further brace plate 24 is attached between the brace plates 22 at the front thereof to lend further rigidity to the front bracing member interconnecting the longitudinal beams 20. A bushing 26 is mounted through holes 28 in the center of the brace plates 22 to provide an axis within which to journal the front wheel assembly 16. The rear of the main longitudinal beams 20 are held in parallel spaced relation by a yoke-type frame member 30 which has a semicircular midportion 32 and two horizontally extending portions 34. The longitudinal beams 20 extend through and are fixed to the frame member 30 at the apex of the midportion 32 and the horizontally extending portion 34. Thus, a simple but rugged frame is provided with an area within which may be mounted the reservoir tank 18.

The rear wheel assemblies 14 are identical mirror images of one another with each being mounted on a horizontally extending portion 34 of the yoke frame member. The rear wheel assemblies have a large pneumatic wheel unit 36 journaled for rotation on a stub shaft 38. The stub shaft 38 is fixed to a vertically extending member 40 which has a plate 42 fixed on the end thereof in horizontal relationship. A plate 44 similar in size and extent to plate 42 is adapted to be placed on the top horizontal surface of the portion 34 of the yoke 30 in parallel spaced relation to the plate 42 which is placed against the bottom horizontal surface of the portion 34. Elongated bolts 46 are attached through aligned holes in plates 42 and 44 to clamp the wheel assembly to the portion 34 of the yoke 30. From this single rear wheel mounting it can be seen that the wheel assembly 14 can be located at any desired point along the horizontally extending portion 34 to adjust the rear wheel tread of the trailer to correspond with the spacing of the rows of crops over which the trailer will pass.

The front wheel assembly 16 has a large pneumatic wheel unit 48 the same size as the rear wheel units 36 which is journaled for rotation on a stub shaft 50. The stub shaft 50 is fixed to the lower end of a vertically extending member 52 which is fixed at its upper end to a horizontally extending plate 54. A pair of gussets 56 are attached between the member 52 and the plate 54 to strengthen the connection therebetween and insure perpendicularity therebetween. A vertically extending shaft 58 is fixed to the center of the horizontally extending plate 54 to be received in the bushing 26 and provide the axis of rotation for the front wheel assembly. The shaft 58 can be safeguarded against dropping out of the bushing 26 by a lock collar assembly 60 attached at the top thereof.

A pair of arcuate plates 62 are attached at one end to the horizontal plate 54 and terminate at their other end in a point in front of and above the plane of the axle 50. The arcuate plate 62 on the side of the wheel 48 of the member 52 is attached thereto by a horizontally extending brace member 64. A horizontally extending shaft 66 interconnects the pair of arcuate blades 62 at their forward ends to provide a journaled point for the tongue assembly 68 and to add further rigidity to the front wheel assembly. The tongue assembly 68 is journaled on the ends of the shaft 66 extending beyond the arcuate plates 62 and has a bar 70 which has angularly inclined braces 72 attached at one end to the bar 70 and at the other end journaled for rotation on the ends of the shaft 66 and held thereon by nuts 74. To add further bracing to the tongue assembly a cross brace 76 can be attached to the end of the bar 70 and extend between the angular braces 72 adjacent the portion that is journaled on the ends of the shaft 66. Thus, as can be seen from the above set forth description of the front wheel assembly a simple but rugged dirigible wheel is provided at the front of the frame which because of the single wheel design thereof permits an extremely sharp turning radius.

The tank assembly 18 comprises an elongated cylinder tank 78 with hemispherical ends and extends from a point just behind the front bracing assembly to a point behind the rear wheel assembly 14. The circumference of the tank 78 is the same as the circumference of the semicircular midportion 32 of the yoke member 30 so that the tank may be mounted firmly thereagainst. Adjacent the yoke portion on either side thereof are a pair of angles 80 attached at the free end of the vertically extending leg to the longitudinal beam 20 and bearing at the free end of their horizontal leg against the circumference of the tank. Extending between the pairs of angles on both sides of the yoke are a pair of enlarged U-bolts 82 which extend through apertures in the horizontal leg of the angle 80 and are fixed therein by a nut and lock nut assembly 84. Thus, the nut and lock nut assembly 84 can be drawn down onto the U-bolt 82 until the tank unit 78 is clamped securely between the semicircular midportion 32 of the yoke and the semicircular portion of the U-bolt 82. The front of the tank unit 78 is similarly suspended, with a pair of angular plates 86 mounted on opposite sides of the tank unit 78 on the longitudinal beam 20 with the free end of the vertical leg thereof attached to the longitudinal beam and the free end of the horizontally extending leg bearing against the circumference of the tank unit 78. An enlarged U-bolt 88 extends under the tank unit 78 and extends through apertures in the horizontal leg of the angle 86 and is secured thereto by a nut and lock nut assembly 90. An additional enlarged U-bolt 92 extends upwardly around the upper circumference of the tank unit 78 and extends downwardly through the horizontal leg of the angular plate 86 and is secured thereto by a nut and locking nut assembly 94. Thus, the mounting of the tank is accomplished by drawing the nut and lock nut assembly 90 onto the U-bolt 88 to draw the U-bolt 88 upwardly until the tank unit 78 is in a horizontal position. The lock nut assembly 94 is then drawn onto the U-bolt 92 to firmly clamp the tank unit 78 between the lower U-bolt 88 and the upper U-bolt 92 to prevent movement of the tank relative to the frame. Thus, the tank unit 78 is securely mounted within the frame 12.

The standard fittings normally associated with such a fertilizer trailer are shown at 96 which provides the outlet for the conduit to the tractor tool bar. From the structure set forth hereinabove, it can be seen that a rugged fertilizer trailer has been provided which has an extremely low center of gravity due to the mounting of the tank within the frame. The extreme low mounting of the tank has a further benefit in that the fittings 96 are easily accessible to a man standing on the ground thus eliminating ladders attached to the side of the tank or other means needed to climb onto the top of the tank to reach the fittings. The lowest parts of the fertilizer trailer that may come into contact with plants over which the trailer passes are the smooth underbody of the tank units 78 and the U-bolts thereby eliminating any abutments or other such undercarriage parts that may snag or damage the plants. As has also been set forth above, the adjustable rear wheel treads permits adjustment to accommodate any spacing between rows of plants to be fertilized.

The modified form of the fertilizer trailer shown in FIGS. 7 and 8 is substantially the same as that shown in FIGS. 1 through 6 with the exception of the rear of the frame member and the support of the tank unit 78' therefrom. The side rails or beams 98 of the modification are shown to be square in cross-sectional area, as a possible alternative to the round longitudinal members of the first embodiment and are attached at the front thereof to the bridge plates 22 and 24. At the rear of the longitudinal beams 98, a plate 100 is attached thereto in perpendicular relationship. A plate 102 similar in size and extent to plate 100 cooperates therewith and has four bolts 104 extending therebetween to clamp the rear suspension assembly therebetween. The rear part of the frame and the suspension of the tank therefrom are combined into a single unit comprising a horizontally extending beam 106 which extends through the tank unit 78 in the plane of a diameter thereof and is fixedly sealed to the walls of the tank where it passes therethrough. The beam 106 has portions 108 that extend beyond the walls of the tank 78' which are clamped between the plates 100 and 102 to thereby become a part of the frame of the fertilizer trailer. The portions 108 of the horizontally extending beam 106 perform the same function as the portions 34 of the yoke-type frame member 30 of the previous embodiment and therefore the identical rear wheel assemblies 14 can be attached thereto to suspend the rear of the trailer on the ground. The modification shown in these FIGS. being substantially the same as that shown in the first modification, the advantages attendant thereon are also inherent with the modifications.

Both embodiments of the fertilizer trailer comprise a basic frame with wheel assemblies mounted thereon and a tank assembly attached within the frame. This simplicity of construction permits different volume tanks to be used on the same basic frame assembly. Thus, in the embodiment of FIGS. 1 through 6 the release of the U-bolts 82, 82, 88, and 92 would permit the tank unit 78 to be removed from the frame assembly. In the modification of FIGS. 7 and 8 the release of the U-bolts 88 and 92 and the detachment of the wheel units 14 and the removal of the plate 102 from the plate 100 would permit the tank unit 78' to be removed from its frame. Therefore, in addition to the great advantages of the low overall height and extremely low center of gravity of the fertilizer trailer set forth herein, a standardization of parts would permit economical production of the trailer units.

Figure 4:
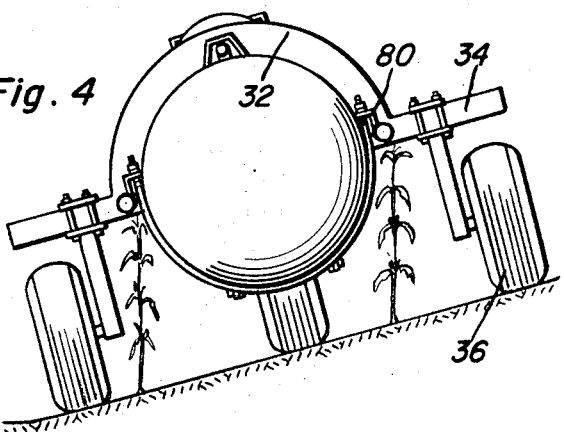
FIG. 4 is a rear end elevational view showing the trailer on an incline.
Figure 5:
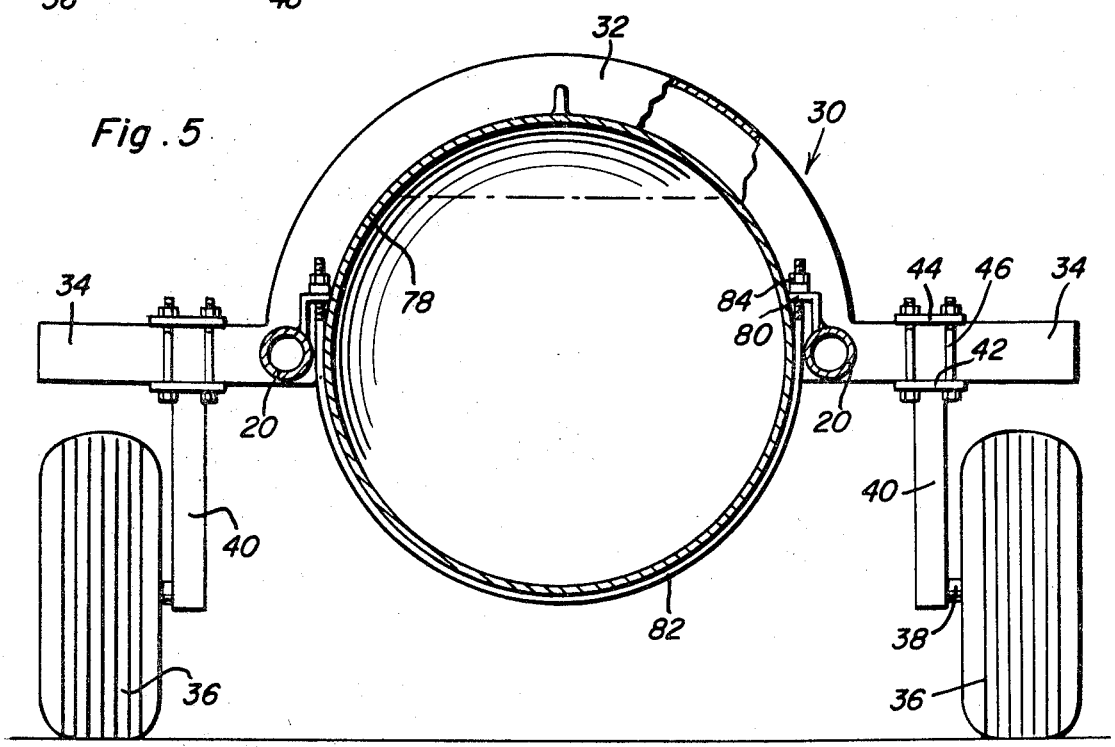
FIG. 5 is a transverse sectional view taken substantially along the line 5–5 of FIG. 1.
Figure 6:
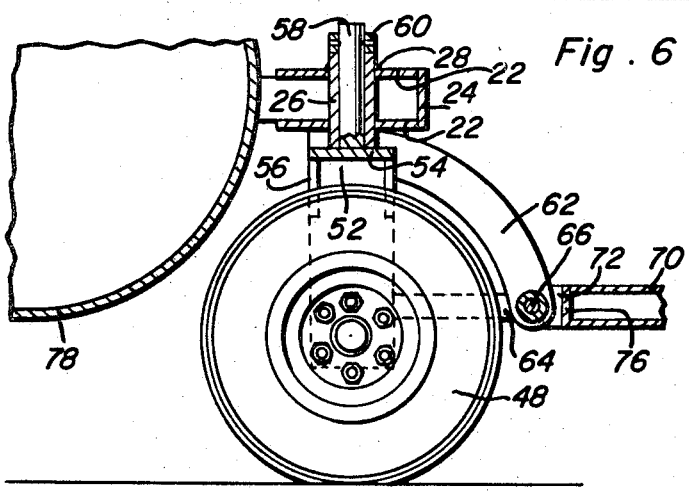
FIG. 6 is an enlarged detailed view, with some parts in section for clarity, showing the single dirigible wheel at the front of the trailer.

One practical embodiment of this invention enables the tank which is approximately 15½ feet long and 41 inches in diameter to be supported with a ground clearance of approximately 12 inches. This arrangement enables row crops such as illustrated in FIG. 3 of a spacing as small as 30 inches to be effectively fertilized inasmuch as the major portion of the tank will be received between the drop plants. While FIGS. 3 and 4 illustrate the row crop at an approximate spacing of 42 inches, even if the row crop is spaced 30 inches apart, the top portions thereof may engage the smooth belly of the tank thus eliminating injury to such crops such as would occur if large frame members extended under the tank.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A fertilizer trailer, comprising: a frame, a tank attached to said frame with a substantial portion of the tank disposed below the horizontal plane of the frame thereby providing a generally smooth, bottom surface for the trailer, wheel assemblies attached to said frame to support said frame and said tank, said frame including two parallel spaced longitudinal beams, means interconnecting the forward ends of said beams, said frame further including a yoke having an upwardly disposed semicircular midportion and a horizontal portion attached to each end of said midportion, with said beams attached at their other ends to said yoke.

2. The device of claim 1 wherein said beams are attached to said yoke at the intersections of the midportion and the horizontal portions of said yoke.

3. The device of claim 2 wherein said tank is circular in cross section, having the same diameter as said midportion of said yoke.

4. The device of claim 1 wherein said wheel assemblies further include a pair of wheels each mounted for adjustment along said horizontal portions of said yoke.

5. The structure as defined in claim 8 wherein said horizontal portions of the yoke are generally in alignment with the center of the tank with the lower periphery of the tank being disposed below the upper periphery of the wheels mounted on said horizontal portions of said yoke.

6. The structure as defined in claim 1 wherein said wheel assemblies include a single dirigible wheel mounted on said interconnecting means at the forward ends of said beams, the upper peripheral edge of the dirigible wheel being disposed above the lower edge of the periphery of the tank.

7. A trailer comprising an elongated body having a substantially smooth undersurface, an elongated frame supporting said body, said frame comprising a pair of rigid beams extending longitudinally of the body for a substantial portion of the length thereof, front steerable wheel means supporting said frame adjacent the forward end thereof, rear wheel means supporting said frame adjacent the rear thereof, said body including a substantial portion thereof disposed below the horizontal plane of said beams, means supporting said body from said frame without any substantial projections from the undersurface of the body below the horizontal plane of the beams.

8. The structure as defined in claim 7 wherein, said means supporting the body from said frame including a transverse support member extending rigidly between the rear end portions of said beams and through said body with a substantial portion of the body below the support member, the outer ends of said support member supporting said rear wheel means whereby a vertical plane in which the center of gravity of the body lies will be disposed between the rear wheel means when the trailer transverses a laterally inclined surface that is inclined at a substantial angle.